INVENTOR
PETER HOPKIN
BY
Pearson + Pearson
ATTORNEYS

United States Patent Office 3,676,029
Patented July 11, 1972

3,676,029
PELLETIZING APPARATUS
Peter Hopkin, 13 Colonial Circle,
Hampton, N.H. 03842
Filed Apr. 9, 1970, Ser. No. 26,969
Int. Cl. B29b 1/02
U.S. Cl. 425—67                              8 Claims

ABSTRACT OF THE DISCLOSURE

An underwater pelletizer has a generally cylindrical, elongated chamber with a generally cylindrical, drum, having longitudinal cutter blades, eccentrically rotatable therein to form a pump. A narrow, linear, longitudinal row of extrusion orifices in the side wall of the chamber, discharges a row of viscous strands from which successive rows of viscous pellets are simultaneously cut off by each blade and driven tangentially into a longitudinal effluent port to clear the orifices of stray pellets. The chamber also includes a longitudinally extending influent port for liquid under pressure which sweeps around the chamber periphery to also clean the orifices while solidifying the viscous plastic.

DESCRIPTION OF THE PRIOR ART

In the art of cutting pellets from a preformed, solid web of plastic, it is well known to provide a drum-type rotor having toothed axially-extending fly knives cooperable with a toothed bed knife, to cut individual pellets from the advancing web. The knives are straight in U.S. Pat. 2,812,815 to Quinsey of Nov. 12, 1957, U.S. 2,798,550 to Kubodera of July 9, 1957 and U.S. 3,244,049 to Smith et al. of Apr. 5, 1966 and are a stack of discs, forming helically arranged blades in U.S. 2,655,213 to Anderson of Oct. 13, 1953.

When the material to be formed into individual pellets is viscous and tacky, rather than a self supporting preformed, solid web, or sheet, the plastic has usually been extruded from a circular pattern of orifices into the atmosphere and cut off with rotating, radially-extending blades as in U.S. 3,025,564 to Voight of Mar. 20, 1962 or U.S. 2,436,201 to Cole of Feb. 17, 1948.

In U.S. 3,042,970 to Terenzi of July 10, 1962, a viscous polymer solution is discharged under pressure from an extruding nozzle directly into a moving stream of liquid precipitant, non-solvent for the polymer, so that hydraulic shear alone will form particulate segments. In U.S. Pat. 3,414,640 to Garetto of Dec. 3, 1968 the viscous plastic is discharged upwardly into an open trough of precipitate, cut off by a radially extending knife and swept into another trough.

U.S. Pats. 2,850,764 of Sept. 9, 1958 and 2,862,243 of Dec. 2, 1958 to Evans, Farr et al., also teach the use of a radially extending rotating cutter blade operable on an annular pattern of extrusion orifices, for forming pellets from plastic extruded into a body of cooling liquid.

It has thus been the teaching of the art to use a perforated, flat disc, type extrusion head with a ring of extrusion orifices and to cut off the pellets with a radially, extending cutter arm which travels in a single plane always at the same distance from the orifices. Not only have the flat disc heads tended to bulge and bend when orifices became plugged but the unsupported radial blade tips have tended to bend. Uneven solidifying, or plugging, of orifices, especially at start-up, have caused the blade to smear the plastic. In addition the rotating of a spider, or squirrel cage, type cutter in a single plane around a ring of holes has caused whirlpooling, turbulence and a formation of a plug of accumulated pellets near the centre of rotation, while uneven heat at the periphery of the disc has caused a reduction in viscosity of the plastic emitted from the outer orifices, all causing considerable down-time for cleaning.

SUMMARY OF THE INVENTION

In this invention, the flat apertured, extrusion head, annular pattern of orifices and radial wiper-arm, type blade have been replaced by an elongated extrusion head with a single, axially-extending, narrow, linear row of orifices and at least one axially-extending, linear cutter blade, the blade sweeping across the orifices to simultaneously cut off a plurality of pellets and drive the pellets simultaneously away from the orifices and out of an outlet. Thus the blade does not wipe across one orifice and carry the resulting pellet across another orifice for possible smearing, nor do the pellets tend to mill around in the vortex created along the centre line of a rotor, as in the prior art. The cylindrical, solid cutter drum and axially extending blades or vanes of this invention create no vortex but if vortical circulation does occur it would draw the pellets to the ends of the chamber for discharge from the outlet and would be countered by the much stronger pumping discharge action of the rotor.

In addition to the pumping action inherent in the eccentrically mounted rotor of the invention, an axially extending peripheral influent port is provided in the side wall of the chamber, through which liquid under pressure, such as 100 p.s.i., enters to travel circumferentially around the side wall to the orifices. Thus each row of severed pellets is not only pushed away from the orifices by the linear blades, but hydraulically flushed away from the orifices and hydraulically pumped out of the outlet.

DESCRIPTION OF PREFERRED EMBODIMENT

Figure 1:
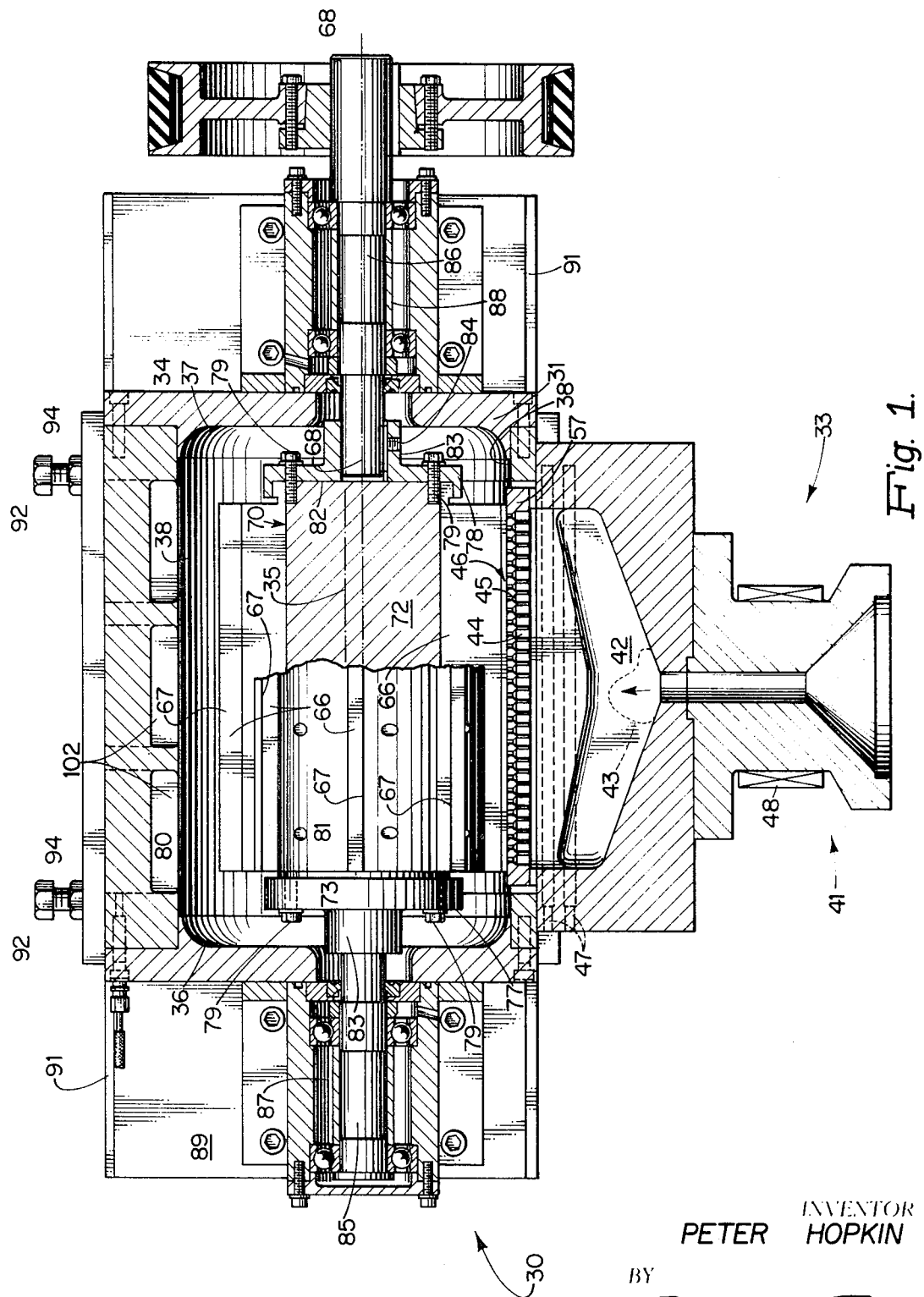
FIG. 1 is a plan view of the apparatus of the invention, in section on line 1—1 of FIG. 2.
Figure 2:
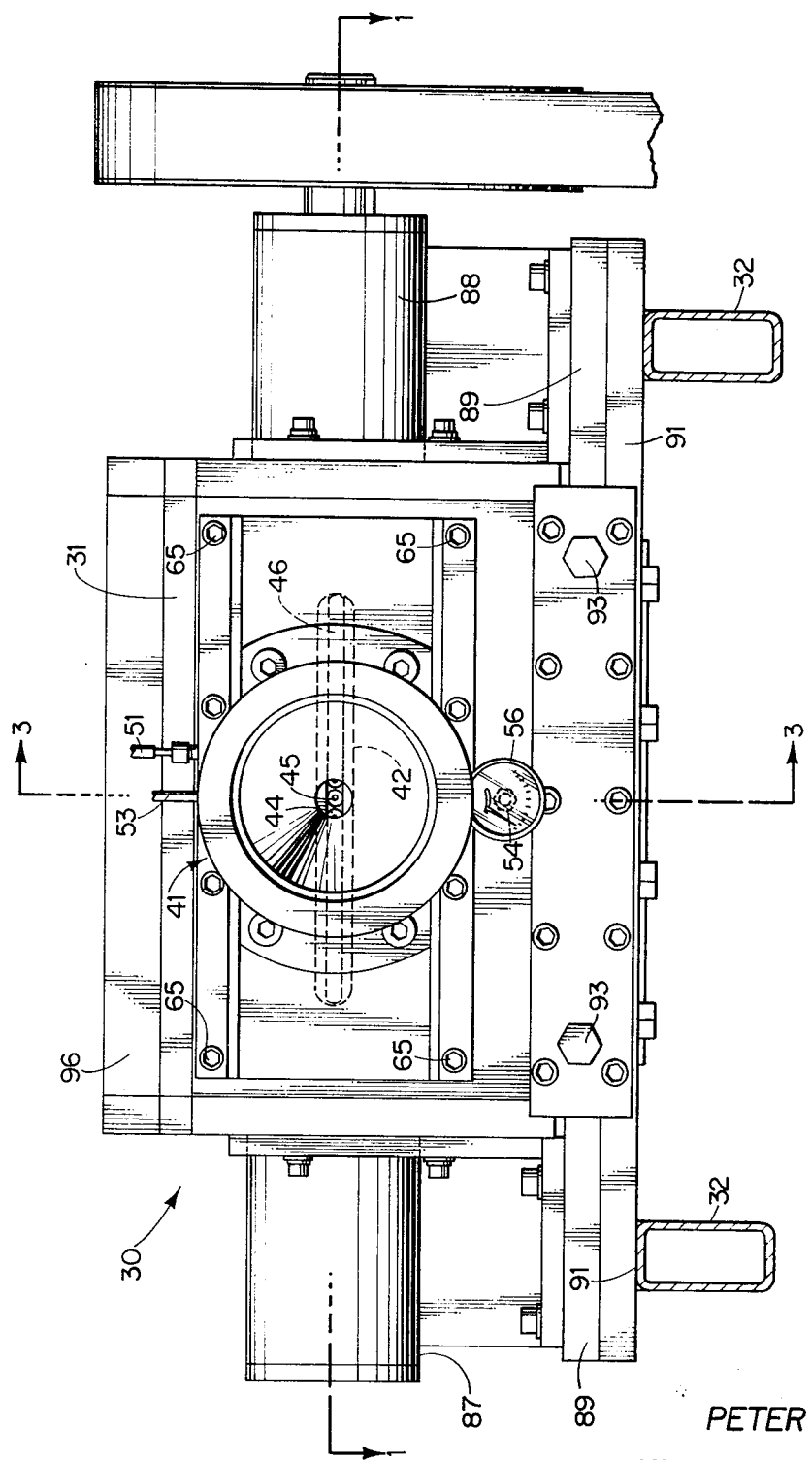
FIG. 2 is a front elevation of the apparatus.
Figure 3:
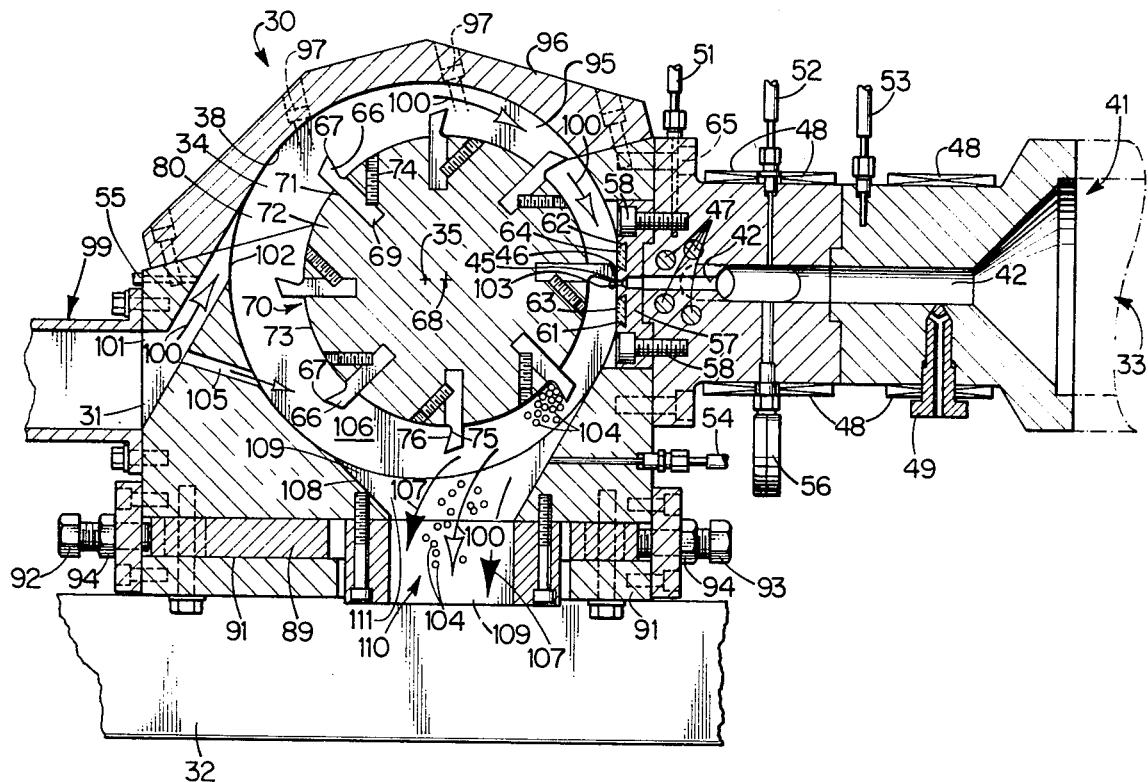
FIG. 3 is a side elevation of the apparatus on line 3—3 of FIG. 2.

As shown in the drawings the underwater pelletizer 30 of the invention includes a housing 31, fixed to suitable frame pieces 32, at the terminal end of an extrusion apparatus 33 of any well known type.

Housing 31 includes an elongated, generally cylindrical, chamber 34 having a central, longitudinal axis indicated at 35, which is preferably horizontal, the chamber 34 having opposite end walls 36 and 37 and a generally cylindrical side wall 38.

Extrusion apparatus 33 includes an extrusion head 41 having a plenum, or manifold chamber 42 which receives viscous, tacky plastic 43 such as a thermoplastic polymer and distributes the plastic through conduits 44 to each extrusion orifice 45 of a plurality of such orifices arranged in an elongated, axially extending, relatively narrow, substantially linear row 46 in the side wall 38 of chamber 34. Because of the linear arrangement of the orifice 45, rather than the annular arrangement of the prior art, the plastic 43 tends to arrive at each orifice at the same time, at the same temperature which may be about 450° F. depending on the melting point of the particular plastic being extruded, also at the same pressure and viscosity, thereby avoiding solidification in one or more orifices which creates back pressure capable of bending a flat disc die. The head 41 preferably includes elongated straight cartridge type electric resistance heaters such as 47, which permit accurate control of heat always at the same distance from the adjacent conduit or orifice. A plurality of ring type resistance heaters 48 are also provided for the same purpose. Head 41 also includes a bleed plug 49 for the removal of any degraded polymer after a run, numerous thermocouple controls such as at 51, 52 and 53, for sensing plastic temperature, 54 for sensing effluent water temperatures and 55 for sensing inlet water temperature and a pressure gauge 56.

Head 41 also includes a flat, elongated die plate 57, fixed by bolts 58 and having elongated parallel dovetail grooves 61 and 62 for ceramic inserts 63 and 64, the ceramic inserts serving as insulation to prevent the influent cooling liquid from extracting heat from the die plate. Housing 31 is fixed to extruder head 41 by bolts 65.

Within the elongated chamber 34, at least one elongated, axially extending blade 66, having a cutting edge 67 is eccentrically mounted to rotate on a central longitudinal axis 68, spaced from, and parallel to, axis 35 so that the path of the edges 67, is close to the row 46 but spaced from the side wall 38 in the remainder of its cylindrical rotary path. Preferably a plurality of identical knives 66, having edges 67, have their bases 69 seated in elongated, axially extending, circumferentially spaced grooves 71 in a cylindrical drum 72 rotatable on axis 68. The drum face 73 thus forms a volute pumping chamber 80 with side wall 38, with the radially extending blades 66 serving as pumping vanes performing the maximum pumping action at the row of orifices 46.

Each blade 66 is held in its groove 71 by a set screw 74 and is cut away at 75 on its leading face 76 to create a sharper cutting edge at 67.

The rotary drum type cutter 70, consisting of drum 72 and blades 66, includes a pair of detachable end collars 77 and 78 affixed by bolts 79 in the end faces 81 and 82 of the drum. Each collar includes an integral sleeve 83 having a set screw 84 for making the collar fast on one of a pair of opposite stub shafts 85 or 86, the stub shafts being journalled in bearing housings 87 or 88 mounted on a longitudinally extending plate 89.

Plate 89 is slidable to move cutter 70 toward and away from the linear row 46 of orifices 45, to establish a desired predetermined clearance, in tracks or gibs 91 in housing 31. The plate 89 is finely adjustable by means of set screws 92 and opposite set screws 93, so that the entire plate, bearing, housings, shafts and cutter can be controlled and adjusted from outside the housing and locked in place by lock nuts 94.

The blades 66 are easily removable for sharpening, or replacement, through the top opening 95 in housing 31, the opening 95 being closed by removable closure plate 96 held in place by bolts 97. The entire rotary drum 70 is also easily removed through opening 95 by unfastening the plate 96, unfastening the collars 77 and 78, sliding the collars back on their stub shafts 85 and 86 and bodily lifting the rotor out of the housing for replacement. Access to the orifices 45 is also gained in this manner in case of plugging thereof or accumulation of an undesired glob of plastic in any part of the rotor or chamber.

The liquid supply means 99, of the invention includes a suitable source of pressurized cooling liquid such as a pump and tank of any well known type, not shown, which will supply for example water at between 125°–250° F. and at about 100 p.s.i. The cooling liquid, indicated by open head arrows 100, enters housing 31 through conduit 101 and axially extending, elongated influent ports 102, in side wall 38, generally tangentially and preferably in the horizontal plane of the orifices row 46, but on the opposite side of the rotor 70 at the same level. Liquid 100 travels peripherally around the upper portion of volute chamber 80, which gradually diminishes in cross section, until the stream 100 engages insulation insert 64, then the entire row of extruded strands 103 as they are being cut into pellets 104 of plastic, and then continues on around the chamber to sweep each successive row of pellets simultaneously away from the orifices. The pumping action of the vaned rotor 70 eccentrically revoluble in volute chamber 80 increases the speed of the liquid in proportion to its speed of rotation for additional control and efficiency.

Preferably influent conduits 101 include a by-pass 105 directing incoming pressurized liquid, counter to the path of the rotor and knives in the lower portion 106 of chamber 80 to unseat any pellets which may become caught in the lower part 76 of the leading face of the knives.

The pellet discharge means 110 of the invention includes the elongated effluent port 111 in the side wall 38 of chamber 80, the port 111 extending axially and being of considerable width so that it is in the tangential path of the pellets 104 being severed at row 46 and mechanically and hydraulically urged away from the orifices. The path of the pellets 104 is shown by solid head arrows 107 and it will be understood that they assume a globular, or spherical, configuration prior to solidification while being transported in liquid 100 toward effluent port 111. Any pellets which do not pass through the port 111 on the first revolution tend to strike the inclined wall 108, in rear of the outlet conduit 109, with a glancing impact from which they rebound into the stream of liquid and are carried around chamber 34 back into the orifice area, by centrifugal force. However, the pellets are all normally thrown to the outside of the chamber for discharge from conduit 109, well in advance of influent port 102 and it is seldom that pellets are carried entirely around the chamber for even a single revolution.

The electric resistance heaters 47 have been found to be far more effective in maintaining uniform viscosity flow and temperature of the plastic, than the conventional hot liquid jackets of the prior art. Similarly the drum type support for the blades of the invention provides support close to the terminal edges 67 so that there is no possibility of bending under stress. The placement of the pellet outlet 109 at the bottom of chamber 34 permits it to function as a sump, or trap, for collection of any foreign material or for cleaning.

I claim:

1. In a pelletizer of the type having a bath of cooling liquid, extrusion apparatus for extruding viscous plastic into said bath, a rotary cutter for cutting said extruded plastic into individual pellets, liquid supply means and pellet discharge means, the combination of:
   an elongated, generally cylindrical, chamber in said pelletizer for containing said bath of cooling liquid;
   a single, elongated, axially-extending, relatively narrow, linear row of extrusion orifices in the side wall of said chamber connecting said extrusion apparatus thereinto, and
   at least one axially-extending cutter blade on said rotary cutter, mounted to rotate within said chamber in a path parallel to the longitudinal axis thereof and having a cutting edge repeatedly sweeping across said single, axially-extending, linear row of orifices to sever a plurality of individual pellets from the plastic emitted therefrom and urge such pellets in the direction of said pellet discharge means.

2. A pelletizer as specified in claim 1, wherein:
   said rotary cutter is generally cylindrical with a plurality of said blades projecting radially therefrom to function as pump blades;
   and said cutter is eccentrically mounted within said chamber to form a volute pumping chamber therewithin;
   the cutting edges of said blades having a predetermined clearance from said orifices for maximum centrifugal pumping action proximate said orifices.

3. A pelletizer as specified in claim 1, wherein:
   said rotary cutter is a cylinder mounted in said chamber to form a centrifugal pump for urging the pellets, cut at said orifices, in a tangential direction,
   and said pellet discharge means is an effluent port located in the side wall of said housing directly in the path of the tangential discharge of said pellets from said orifices.

4. A pelletizer as specified in claim 1, wherein:
said rotary cutter is a cylindrical drum, with a plurality of said blades spaced uniformly therearound, and eccentrically rotatable in said chamber in a predetermined direction to form a pump, and
said liquid supply means includes a longitudinally extending influent port in the side wall of said casing, in advance of said orifices, said means directing influent liquid circumferentially and peripherally therearound in the direction of rotation of said cutter.

5. A pelletizer as specified in claim 1, wherein:
the longitudinal axis of said chamber and rotary cutter is horizontal, said orifices extend horizontally and longitudinally about at the level of the axis of said cutter;
said liquid supply means includes a horizontally and longitudinally extending influent port in the side wall of said casing at the level of the axis of said rotor diametrically opposite to said orifices, and
said pellet discharge means includes a horizontally and longitudinally extending effluent port at the bottom of the side wall of said chamber.

6. A pelletizer as specified in claim 1, wherein:
said pelletizer includes a main body portion containing said bath and in which said rotary cutter is journalled on a pair of opposite stub shafts,
a removable closure plate attached to said main body portion for forming an opening sufficient to remove said cutter and
removable collars between said stub shafts and said rotary cutter for permitting said cutter to be disengaged from said stub shafts while said shafts remain journalled in said body portion.

7. In a pelletizer the combination of:
a generally cylindrical liquid chamber having a generally cylindrical side wall and a longitudinal axis;
a generally cylindrical drum mounted to rotate within said chamber on an axis parallel to said axis, said drum having a plurality of axially-extending blades projecting radially therefrom and forming pumping vanes within said chamber;
extrusion means, including a single, narrow, axially-extending row of extrusion orifices in the side wall of said chamber adapted to extrude viscous plastic into said chamber and into the path of the blades of said rotor for severance into individual pellets;
liquid supply means including an axially-extending influent port in the side wall of said chamber for directing liquid in a circumferential path therearound toward said row of orifices, and
pellet dicharge means including an axially-extending effluent port in the side wall of said chamber for receiving pellets discharged tangentially by the blades of said cutter.

8. In a pelletizer:
elongated cutter housing means having a generally cylindrical cutting chamber therewithin with an axially-extending liquid inlet port zone, an axially-extending plastic extrusion orifice zone and an axially-extending plastic pellet outlet port zone located at spaced distances around the circumferential wall of said chamber;
a cylindrical drum type cutter having spaced axially-extending, radially projecting knives mounted therearound, said drum being rotatable in said housing chamber with the longitudinal cutting edges of said knives at a spaced distance from said plastic extrusion orifices, to cut pellets from the plastic extruded therefrom;
liquid supply means for supplying cooling liquid to said inlet ports to travel circumferentially around said chamber, past said orifice zone and out of said outlet ports with said pellets, and
extruder means, including a plurality of discharge orifices, extending axially along said extrusion zone in a predetermined, generally straight line single row pattern, for extruding plastic material into the path of said knife edges to be cut into individual pellets and discharged with said liquid from said outlet port zone.

References Cited

UNITED STATES PATENTS

| | | | |
|---|---|---|---|
| 2,975,483 | 3/1961 | Cooper et al. | 83—906 X |
| 2,739,647 | 3/1956 | Coste | 83—355 |
| 3,245,300 | 4/1966 | Hasten et al. | 18—12 AX |
| 3,367,222 | 2/1968 | Mummery | 83—355 X |

FOREIGN PATENTS

| | | | |
|---|---|---|---|
| 1,488,018 | 7/1967 | France | 18—12 A |

J. SPENCER OVERHOLSER, Primary Examiner

N. E. LEHRER, Assistant Examiner

U.S. Cl. X.R.

264—142; 425—382, 311, 196